(12) United States Patent
Zambaux

(10) Patent No.: US 9,149,939 B2
(45) Date of Patent: Oct. 6, 2015

(54) DISPOSABLE ISOLATOR COMPRISING MEANS FOR FILLING CONTAINERS

(75) Inventor: Jean-Pascal Zambaux, Audenge (FR)

(73) Assignee: PALL LIFE SCIENCES BELGIUM, Hoegaarden (BE)

( * ) Notice: Subject to any disclaimer, the term of this patent is extended or adjusted under 35 U.S.C. 154(b) by 1041 days.

(21) Appl. No.: 13/255,001

(22) PCT Filed: Mar. 4, 2010

(86) PCT No.: PCT/EP2010/052767
§ 371 (c)(1),
(2), (4) Date: Oct. 27, 2011

(87) PCT Pub. No.: WO2010/100234
PCT Pub. Date: Sep. 10, 2010

(65) Prior Publication Data
US 2012/0031042 A1 Feb. 9, 2012

(30) Foreign Application Priority Data

Mar. 6, 2009 (EP) ..................................... 09305210

(51) Int. Cl.
*B67C 3/26* (2006.01)
*B25J 21/02* (2006.01)
(Continued)

(52) U.S. Cl.
CPC .................. *B25J 21/02* (2013.01); *B65B 3/003* (2013.01); *B65B 3/04* (2013.01)

(58) Field of Classification Search
CPC ........... B01L 1/02; B08B 15/00; B08B 15/02; B08B 15/023
USPC .......... 141/93, 51, 275, 269, 278, 283; 312/1; 422/544; 454/49, 56, 57, 187
See application file for complete search history.

(56) References Cited

U.S. PATENT DOCUMENTS

| 5,159,799 A | 11/1992 | Rising et al. |
| 5,262,578 A * | 11/1993 | Hall .............................. 588/249 |
| 5,342,121 A * | 8/1994 | Koria ................................. 312/1 |

(Continued)

FOREIGN PATENT DOCUMENTS

| FR | 2155816 A1 | 5/1973 |
| WO | 03035116 A2 | 5/2003 |
| WO | 2007019568 A2 | 2/2007 |

OTHER PUBLICATIONS

Greb, "The Future of Disposable Containment", PharmTech.com, Jun. 18, 2008, 2 pages—XP002572222.

(Continued)

*Primary Examiner* — Jason K Niesz
(74) *Attorney, Agent, or Firm* — King & Schickli, PLLC

(57) ABSTRACT

The invention relates mainly to a disposable working place or chamber and in particular to a disposable isolator.

The invention relates to a disposable isolator (1) defining a top portion (10) and a bottom portion (20), said top and bottom portions being linked together by one or more side walls (30) forming all together an inside portion (40), wherein said bottom portion (20) comprises at least one support area (21) for positioning at least one container (80), wherein said disposable isolator (1) comprises at least one filling means (12), wherein said filling means (12) and said support area (21) cooperating, independently or not, to position at least one container substantially in front of said filling means to fill said container by a product.

7 Claims, 6 Drawing Sheets

(51) Int. Cl.
  *B65B 3/00*  (2006.01)
  *B65B 3/04*  (2006.01)

(56) References Cited

U.S. PATENT DOCUMENTS

| | | | |
|---|---|---|---|
| 5,585,771 A | | 12/1996 | Ervasti et al. |
| 5,881,535 A | | 3/1999 | Gliniecki et al. |
| 5,971,043 A | * | 10/1999 | Aldrich .................. 141/270 |
| 6,651,404 B1 | | 11/2003 | Hertfelder |
| 7,146,781 B1 | | 12/2006 | Cole |
| 7,690,406 B2 | * | 4/2010 | Giesen .................. 141/275 |
| 8,298,054 B2 | | 10/2012 | Hodge et al. |
| 2004/0158121 A1 | | 8/2004 | Ford et al. |
| 2006/0119232 A1 | | 6/2006 | Tattershall |
| 2007/0034643 A1 | | 2/2007 | Keyes et al. |
| 2010/0107567 A1 | | 5/2010 | Khan et al. |
| 2013/0017131 A1 | | 1/2013 | Galliher et al. |

OTHER PUBLICATIONS

Partial European Search Report EP 14 18 9523 Mar. 17, 2015.

* cited by examiner

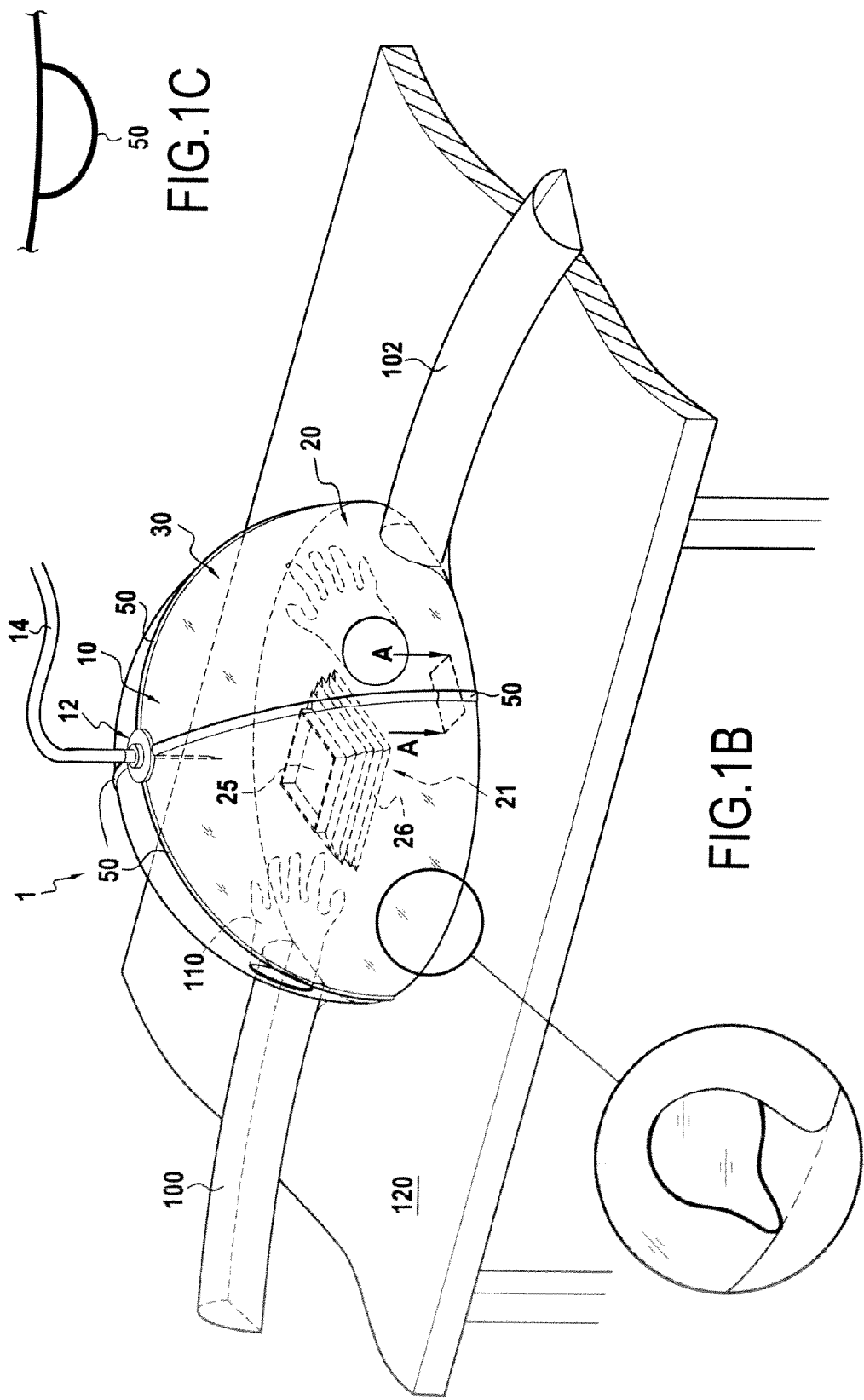

DISPOSABLE ISOLATOR COMPRISING MEANS FOR FILLING CONTAINERS

The invention relates mainly to a disposable working place or chamber and in particular to a disposable isolator.

STATE OF THE ART

Since several years, there is a need of providing disposable working places or chambers and in particular of disposable isolators. Many designs were described. Available designs allow one skilled in the art to handle materials inside the working chamber, very often under inert atmosphere.

U.S. Pat. No. 5,585,771 describes an enclosure for maintaining a controlled atmosphere around a work station. This device is useful for welding metals in an inert atmosphere. The workpieces or tools are introduced through the open top when the enclosure is deflated.

WO 03/035116 relates to a mobile isolation glove box with a disposable enclosure for permitting a specimen to be introduced inside the enclosure. This device needs a rigid frame to support the disposable enclosure.

US 2004/0158121 relates to a portable and disposable examination unit with air tube frame.

However the prior art does not solve many problems identified by the present inventors.

GOAL OF THE INVENTION

The present invention aims to solve the technical problem of providing easy cleaning and/or sterilizing operations, in particular between two production operations in a minimum interruption of production time period.

The invention aims to provide a device for easy validation of the cleaning or sterilization between two production operations.

The present invention aims to provide a disposable isolator which may be qualified for handling products needing regulations and/or approval by Competent Authorities such as for pharmaceutical compounds, biohazardous compounds, anticancer or anti-viral drugs, etc.

Moreover the invention aims to solve the new technical problem of providing a disposable device enabling to automatically fill, preferably with a high throughput, vials or containers located inside said disposable device.

The invention aims to diminish the time of contact with contaminants or pollutants of a product to be filled in a container.

DESCRIPTION OF THE INVENTION

The present invention relates to a disposable working place or chamber and in particular to a disposable isolator.

The present invention is not limited to human intervention and covers robot manipulation.

By "robot manipulation", it is understand any automatic means helping the manipulation, but not excluding human intervention. This manipulation may be driven by a computer or any control system.

"Inside" refers to the inside portion of the disposable device and "outside" refers to the outside of the disposable device.

Thus the present invention relates to a disposable isolator defining a top portion and a bottom portion, said top and bottom portions being linked together by one or more side walls forming all together an inside portion, wherein said bottom portion comprises at least one support area for positioning at least one container, wherein said disposable isolator comprises at least one filling means, wherein said filling means and said support area cooperating, independently or not, to position at least one container substantially in front of said filling means to fill said container by a product.

Said cooperation may be typically performed using external means, such as mechanical machine, or automated machines, controlled or not by control systems, or robot manipulation.

According to one embodiment, said bottom portion comprises at least one support area comprising an outside surface and an inside surface, wherein said outside surface is defining a receiving means to receive a support means to support at least one container, said support means is located outside said disposable isolator, said inside surface is defining a receiving means to receive at least one container located inside said disposable isolator, and wherein said container is moved using said support means, said disposable isolator comprises at least one filling means located in the top portion, said filling means being substantially in front of said support area.

The disposable isolator is a bag, wherein one or more containers may be placed inside the bag, and wherein a support for these containers is located outside said bag. In one embodiment said support means may move the location of the containers inside the bag, notably to position at least one container in front of a filling means so that one or more containers may be filled by one or more products. In another embodiment, said filling means may move notably to be positioned in front of at least one container so that one or more containers may be filled by one or more products.

The disposable isolator of the invention is substantially flexible so it may be easily disposed of. The isolator is made of one or more flexible materials. The upper and bottom portions, and side walls may be made of the same or different materials.

A flexible part of the disposable isolator may comprise one or more rigid parts. Said disposable isolator may be a one piece device, preferably made of at least one disposable material such as plastics, as for example PE (Polyethylene), PP (Polypropylene), PFA (Perfluoroalkoxy), polyaryletherketone, PEEK (Poly(ether ether ketone), etc. This device may be prepared by combining different materials easily recycled and known generally as disposable materials. A preferred embodiment relates to a disposable isolator made entirely of one or more transparent materials, but translucent materials may be used. Another embodiment relates to a transparent or translucent disposable isolator. No particular limitation is made on the material of the invention. A preferred embodiment relates to flexible materials since they give reduce the place of the disposable isolator and makes it easy to store and to dispose of.

The disposable isolator may be supported or hanged by a rigid support or casing. The disposable isolator may be inflated. In order to present a particular shape, the isolator may comprise one or more structure forming means which may be inflated separately from or together with the inside portion. These structures forming means may comprise one or more tubes, casing, or housing. This particular shape may vary and/or be controlled by the pressure of the inside portion of the disposable isolator or the pressure of said structure forming means.

The support area of said device comprises a plane or substantially plane surface and flexible side parts. The plane surface may present rigid parts or may be fully rigid. This surface is designed to receive one or more containers. In an embodiment the plane surface is designed to receive a well plate or a tray comprising several containers or vials. Such trays or well plates are marketed for example by Newmark system Inc. A plane surface may include a rigid plastic material surface thermosealed, or fixed by other means, to the flexible material of the disposable isolator support area.

The support area is designed to receive a support means, such as a XY or XYZ plate, and allows its movement, said support means being located outside said disposable isolator. A XY plate is movable relative to the main arm in two axes, whereas a XYZ plate is movable relative to the main arm in three axes. Such XYZ plates are commercially available and are available for example at EFD. Typical dimensions of such plates vary between 50×50 mm and 1200×1200 mm and are for example of 300×200 mm. The support area is designed according to the dimension of the support means such as a XYZ or XY plate, and may vary in a wide range. Is it preferred to use standard dimensions. The support area may include an excrescence of the disposable material forming the disposable isolator.

Side parts of the support area are made of a flexible material, which is preferably the same as the material used for the disposable isolator. These side parts are designed to allow a movement of the support means, such as a XY or XY plate. The movement referred to is especially a movement of said support means to position a tray in front of a filling means.

Said support area comprises on the outside surface one or more means for locking said support means (such as a XYZ or XY plate) and/or comprising on the inside surface one or more means for locking said container. Locking may be obtained by protuberances positioned at one or more extremities of said support area. In an embodiment the support area has a square or rectangular cylindrical shape. In another embodiment said area has a circular or oval cylindrical shape.

In an embodiment said support means, or XY or XYZ plate, is placed outside the disposable isolator and a tray containing vials or containers is placed inside the disposable isolator, notably on the plane surface of the support area so the tray may be supported by said support means. In an embodiment said XY or XYZ plate is positioned to support said tray, said support area of the disposable isolator being located in between said XY or XYZ plate and said tray. The support means and tray are sufficiently locked to the plane surface so the tray is supported and moved according to the position of said XY or XYZ plate. Of course no limitation is made to a support means, XY or XYZ plates being given as examples of said support means.

The container may be a plurality of containers or of vials advantageously placed into a tray, and having a position which may be determined by an automatic calculator or any other means.

In an embodiment, the filling means comprises at least one needle for filling a container by a product, said needle being preferentially fixed on the disposable isolator. Without any particular limitation to any way to fix said needle, the needle may be sealed, notably thermosealed, screwed, clipped, or clamped. One goal is that said needle is sufficiently hermetically and/or watertight fixed, attached or locked to the disposable isolator. Pre-filled syringes may be used to add one or more products. Such syringes are marketed by BD for pre-filled syringes.

The filling means may move upwards and/or downwards to fill a container. For allowing a movement of said filling means, the internal pressure of the disposable isolator may vary. The pressure of structure supporting means may vary too, separately or at the same time. When decreasing the pressure the filling means goes downwards, and the contrary when pressure is increased. The disposable isolator may comprise means for controlling the pressure, and/or means for varying the pressure of inside part of said isolator. A special gas may be injected near the filling means to create a specific gas environment during injection of the fluid filling the containers. Typically this special gas may be an inert gas.

A filling means is fully described in WO 2007/019568 (US 2007/0034643), which is incorporated by reference in its entirety. Said filling means is a volumetric fluid dispensing device of a predetermined volume of fluid to fill the containers. The pressure of the filling means may be adapted to the internal pressure of the isolator so that there is no impact of an isolator pressure variation on the filling. A connection between said filling means and said isolator may avoid any pressure influence on the filling. This is illustrated by FIG. 7. Other filling means are marketed by Flexicon or PKB. The filling means may comprise a volumetric assay after filtration.

The pressure of the disposable isolator inside portion may be fixed or vary. The inside portion pressure may be higher than the pressure of the pressure outside of said isolator, or lower. For example, such isolator inside pressure is of 10-50 mbar higher than the outside pressure, or of 1-20 mbar lower than the outside pressure.

A XYZ may avoid in some extend upward and downward movements of the filling means. A vertical movement (Z movement) of the support means will put up the tray or container.

The bottom portion of said isolator comprises one or more other areas designed to receive other means. In an embodiment one or more area is designed to receive a weight scale and preferably an analytical balance. This area may be made completely or partially of a flexible material. If a weight scale is to be used, it is preferred that said flexible material allows the positioning of said weight scale and do not impact the weight measure. This area may present a plane surface flexible and thin enough to be positioned correctly on a weight scale or analytical balance and avoid measure errors. This may be a film of PE, polysulfone, etc. This area may comprise on the outside surface one or more means for locking said support means (such as a XYZ or XY plate) and/or comprising on the inside surface one or more means for locking said container.

The disposable isolator may comprise an inlet means and an outlet means for introducing and respectively discharging one or more products or materials inside or outside said disposable isolator. This may be sleeves.

The disposable isolator may comprise at least one means for manipulating a product or material introduced inside said disposable isolator. This may be one or more pairs of gloves.

The invention avoids any contamination by external pollutants of the product(s) filling a container. The products added according to the invention remain protected by the internal atmosphere starting from the filling means to the container until there sealing.

There is no limitation on the products filling said container. These are solids, such as powders, or fluids such as gas or liquids, such as mono or multiphasic liquids, all type of solutions, suspension or emulsions. These products may be pharmaceutical, veterinary or cosmetics compounds, biohazardous or potent compounds, anti-cancer or anti-viral drugs, etc.

In an embodiment an inert fluid is used as internal atmosphere of said isolator. Such fluid may be or comprise nitrogen, helium, argon, neon, krypton or oxygen or any other suitable liquefiable gas. Usually nitrogen is used as inert fluid. Usually before filling a container or vial by a product, a step of filling said container or vial by an inert fluid is required.

Using such an inert fluid as internal atmosphere inside the isolator avoids this step of filling the containers by an inert fluid.

The disposable isolator may means for receiving one or more probes and/or sensors, without any limitation to particular probes or sensors. Sensors may be temperature, pressure, p(O2), or p(N2) sensors, or alarm devices. These sensors or probes may be connected to or controlled by a computer. Information may be exchanged between a sensor or probe and a computer. Controlling the pressure may be important to check for any possible leak. An alarm may inform of a leak, and thus of a small hole in the isolator.

The invention avoids using a laminar flow to protect the product from a contamination. No such laminar flow is needed because the product is safely protected inside the disposable isolator.

The containers or vials may be protected when located inside a tray by placing a removable sheet onto the upper surface of the tray. For example this may be a plastic removable sheet opened after the tray is put inside the disposable isolator.

One or more trays or vials or containers may be introduces inside the disposable isolator via an inlet, such as a sleeve. Said inlet has a proper dimension to permit the trays, vials or containers to be introduced inside the disposable isolator.

The same applies to the outlet means for discharging said trays, vials or containers.

Said inlet or outlet means may be closed by a clamp. Said clamp may be automatically opened or closed by pneumatic means, optionally controlled by a computer.

A method for using the disposable isolator is as follows:

The deflated disposable isolator is positioned on a laboratory table. The position is defined according to the support area of the isolator which should be correctly placed on the support means, such as a XY or XYZ plate. The support area may be locked to said support means by way of protuberances for example. Said protuberances are designed to fit with the size of the support means. In case a XY or XYZ plate is used, a rectangular shaped support area may comprise a protuberance at one or more edges. The XY or XYZ plate is placed so the protuberance may fix the support area to the XY or XYZ plate. When said XY or XYZ plate moves, the surface of the support area moves too. This surface may be rigid. The disposable isolator and/or structure forming means may be inflated separately or together. The structure forming means may be inflated only. The disposable isolator may present a higher or lower pressure than the laboratory pressure. The filling means may be located at the very high top of said disposable isolator. This part may not comprise structure forming means so that this part may have a movable position. This may be useful if the filling means position has to be defined via the isolator pressure. Decreasing the inner pressure of the isolator make the filling means goes downwards. In case of a needle is used as filling means, it may be placed into a vial via this procedure. The filling means may go upwards by increasing the inner isolator pressure.

On the inner surface of said support area, protuberances may be used to fix a tray containing vials or other containers. Accordingly said tray position varies together with XY or XYZ plate position. This allows placing a vial in a defined position, and notably in front of the filling means. Then the vial is filled through said filling means. A new position is defined by XY or XYZ plate so another vial may be filled.

After inflation of the isolator a tray may be introduced through the inlet, which is generally a sleeve, and said tray being positioned on the support area inner surface. Preferably this surface is rigid to correctly and easily position the tray and the support means.

After the filling steps, the tray may be discharged through the outlet means, which is generally a sleeve. Inlet and outlet may be hermetically and/or watertight closed by any suitable means. Inlet and outlet are opened only when needed.

In one embodiment, said support area may be separate from the rest of the disposable isolator. The support area may be a rectangular, square, circular, or ovoid cylinder. It is designed according to the support means used. The support area may be positioned on the support means, in particular on a rigid portion of the support area. The support area is preferably locked to the support means via protuberances located on its outer surface. The rigid surface of the support area may be positioned on the upper part of a XY or XYZ plate. The support area side parts, which may be totally or partially flexible, extend downwards along the support means. This side parts are locked or fixed to a defined area of the disposable isolator designed to receive said support area. This embodiment allows placing easily the whole disposable isolator onto the support means. This manipulation is easier when the isolator is deflated.

The disposable isolator may comprise a casing including one or more areas for fixing or locking external devices. The casing may be a plastic sheet comprising one or more holes designed to receive said external devices. External devices may be selected from the group consisting of the above described support area, the above described inlet, the above described outlet, the above described filling means, the above described manipulation means, and other areas such as area designed to receive a weight scale or an analytical balance. The disposable isolator according to the invention may be marketed without or with some of the external devices. Said external devices may be marketed separately from the isolator casing.

On the drawings

FIG. 1B represents a perspective of an inflated disposable isolator of the present invention;

FIG. 1C represents different embodiments of the AA section according to FIG. 1B;

Figure 1A:
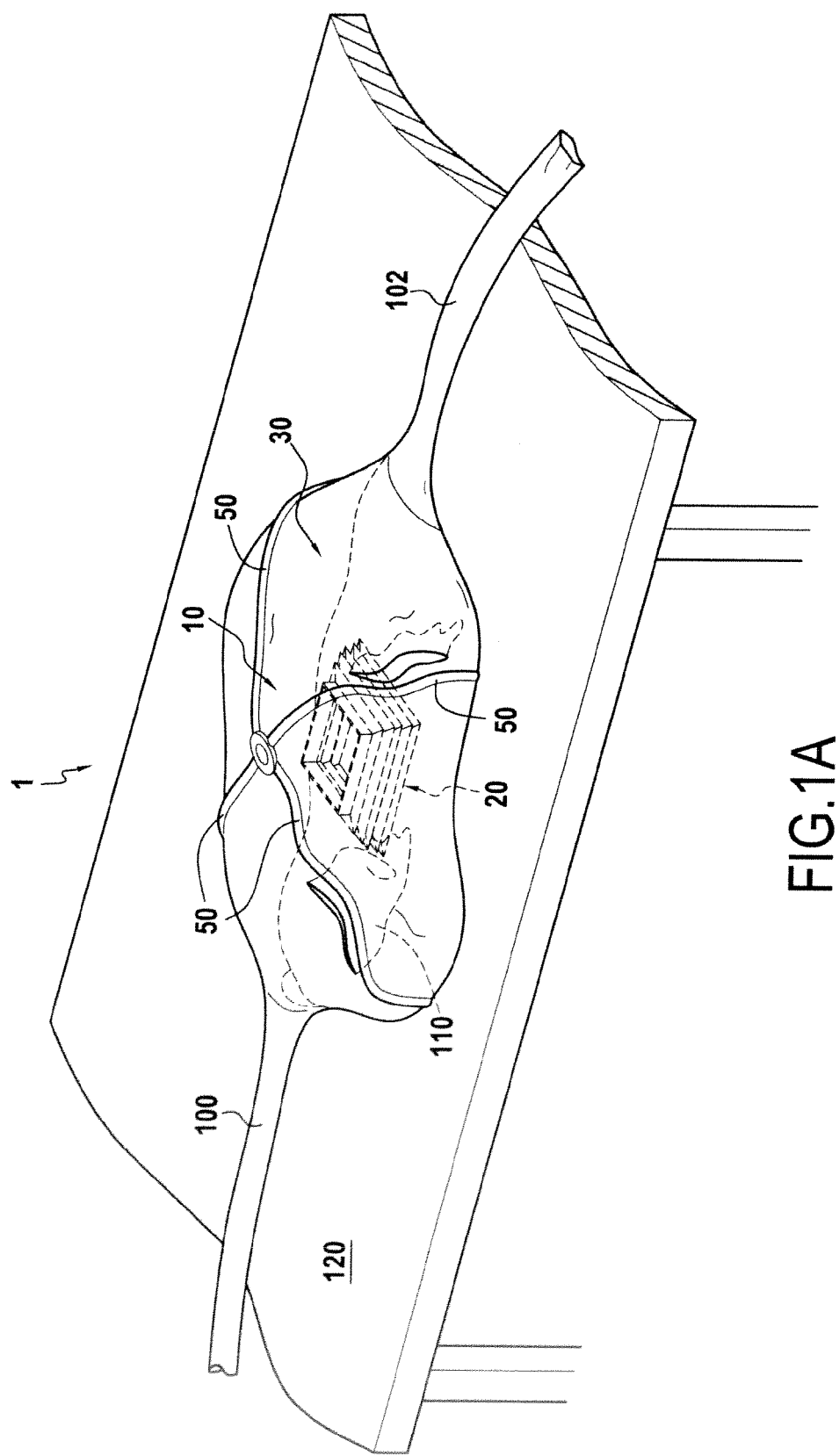
FIG. 1A represents a perspective of a non-inflated or non-completely inflated disposable isolator of the present invention.

FIG. 1A represents a non-inflated or non-completely inflated disposable isolator 1 defining a top portion 10, a bottom portion 20, and side walls 30. The disposable isolator 1 comprises an inlet means 100 and outlet means 102. Structure forming means 50 are no inflated or non-completely inflated and do not give the hemisphere form of this disposable isolator. There is no restriction on a particular size or shape of said disposable isolator. Gloves 110 may be present for manipulating materials inside said isolator. No filling means 12 (see FIG. 1B) are represented on this view but said filling means 12 may already be prefixed on the non-inflated isolator 1.

FIG. 1B represents an inflated disposable isolator 1 defining a top portion 10, a bottom portion 20, and side walls 30. According to FIG. 1B the disposable isolator 1 is a one piece device forming a hemisphere. This may be other shape suitable for a technician to operate such as a cylinder, a cone, or a parallelepiped.

Figure 2:
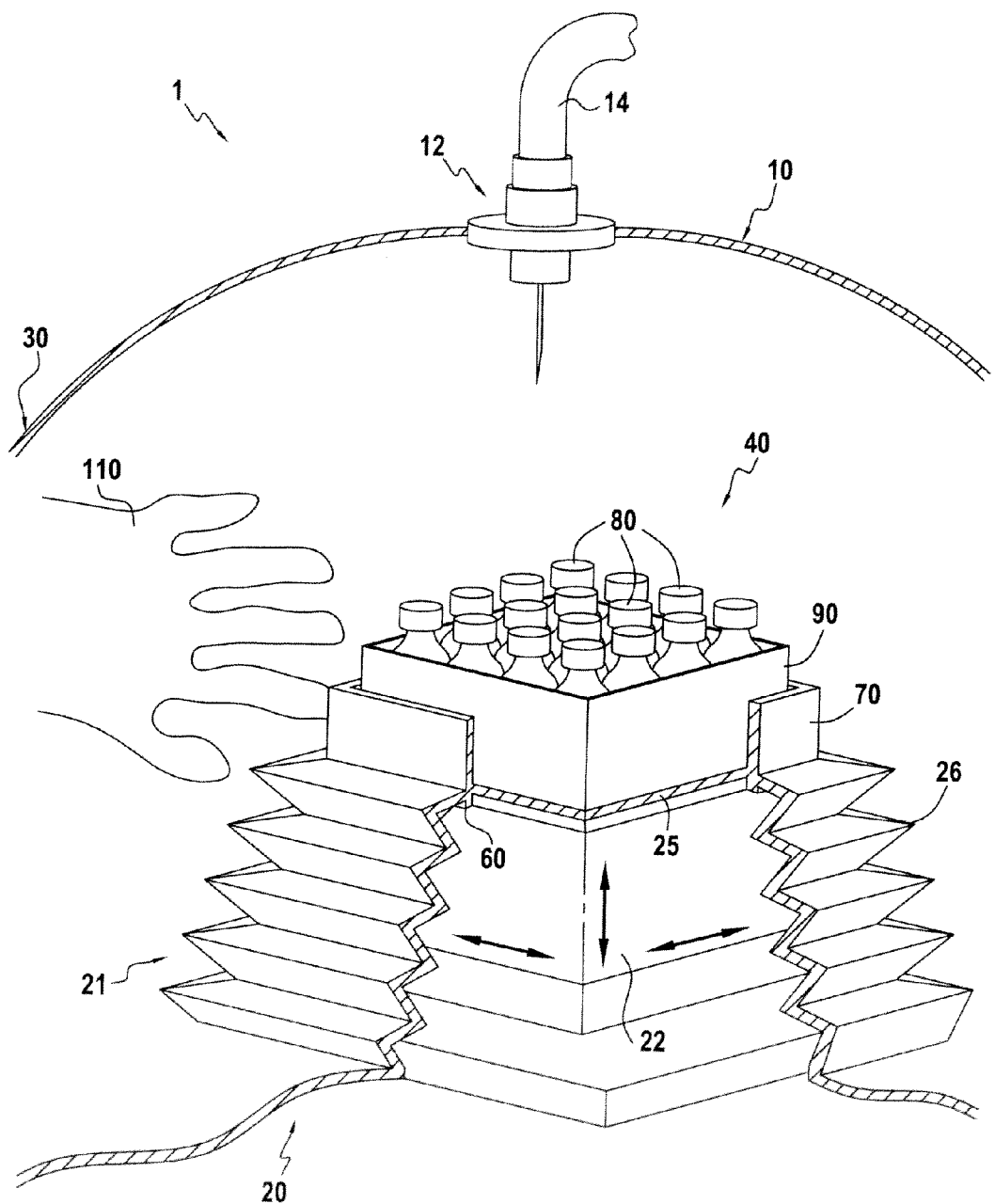
FIG. 2 represents a schematic partial perspective of a support area, a support means and a filling means according to the invention with a cross section of the support area and top portion of the disposable isolator.
Figure 3:
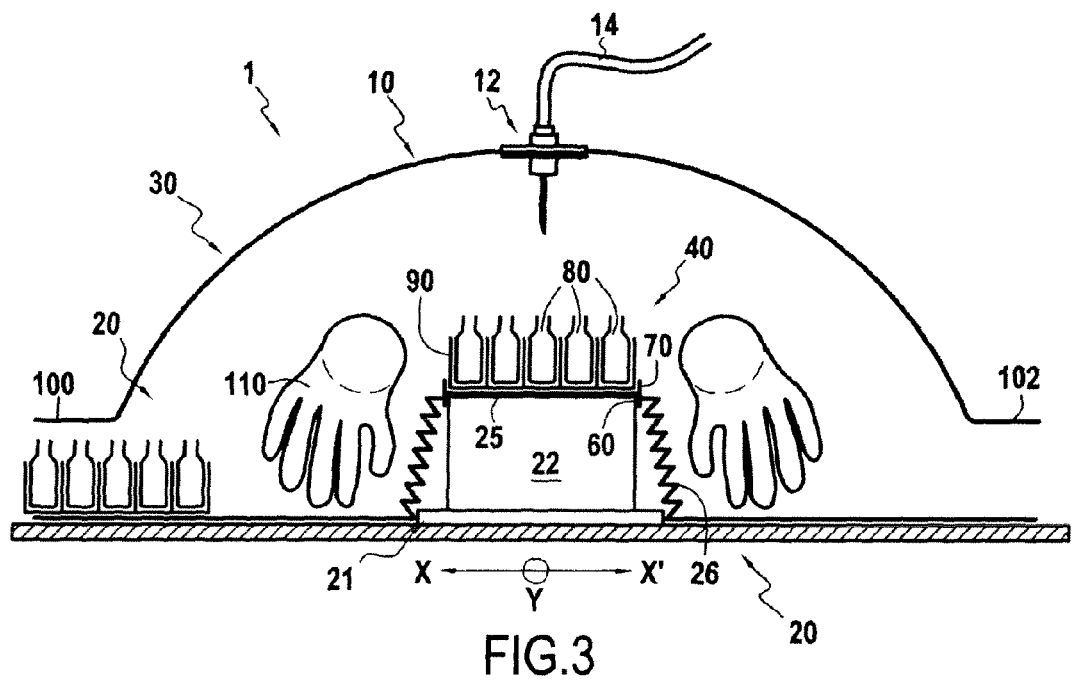
FIG. 3 represents a schematic cross section of a disposable isolator including a tray comprising containers, a XY plate, and a ZZ' movable arm.
Figure 4:
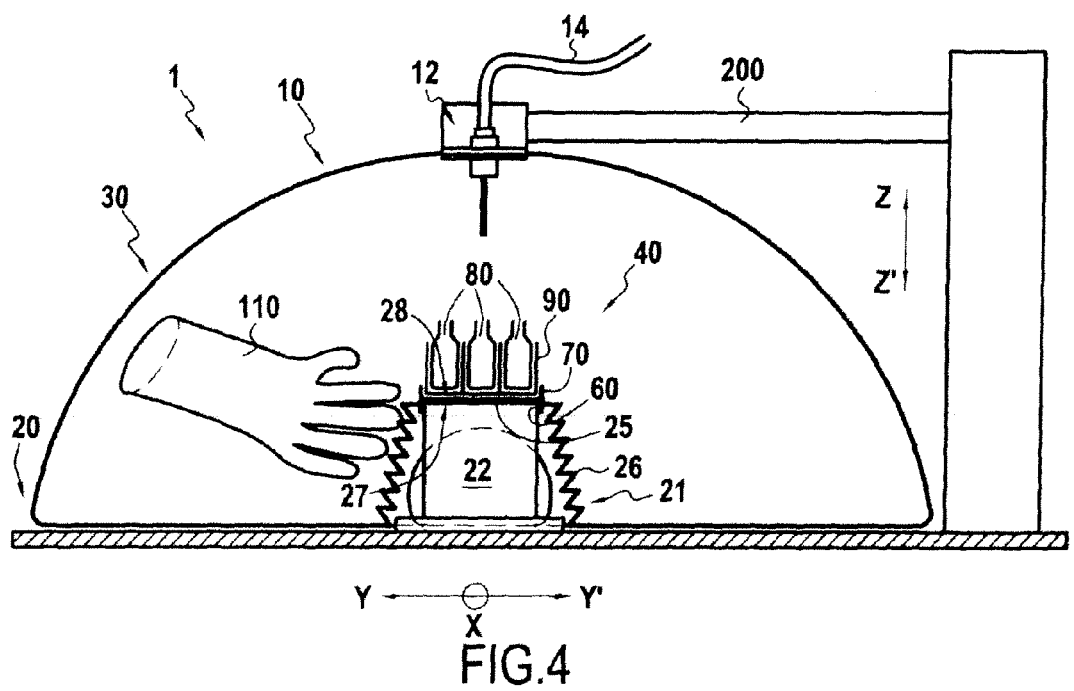
FIG. 4 represents another schematic cross section of a disposable isolator including a tray comprising containers, and a XY plate.
Figure 5:
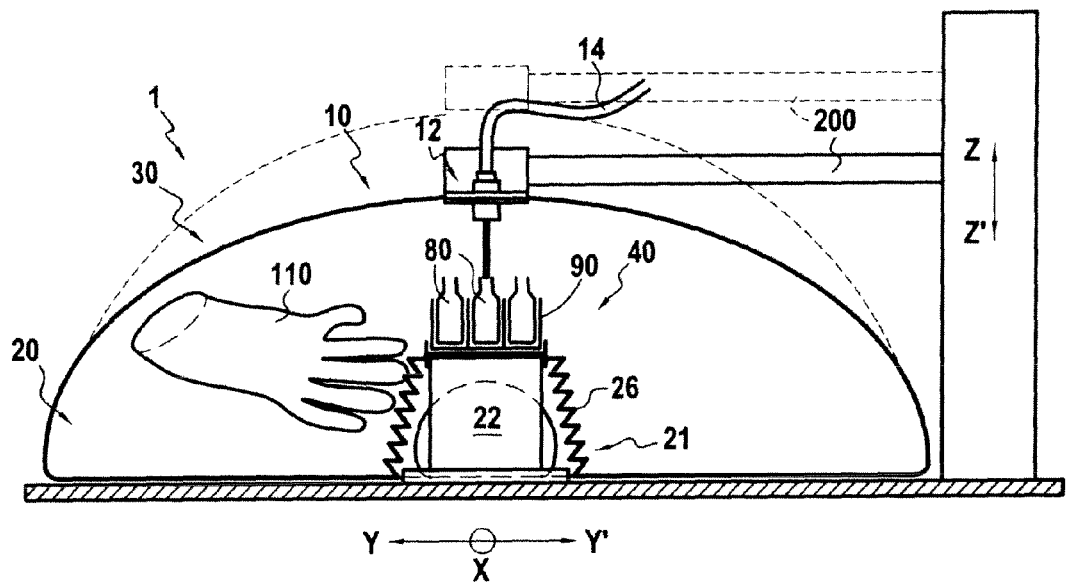
FIG. 5 represents a schematic cross section of a disposable isolator according to FIG. 4 wherein said ZZ' movable arm is positioned to fill a container.
Figure 6:
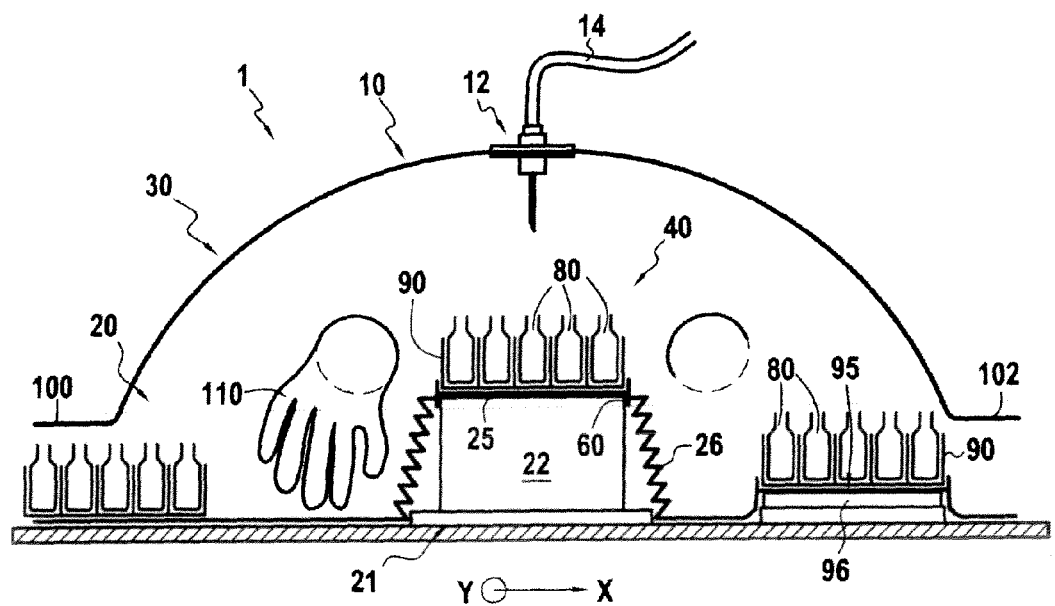
FIG. 6 represents a schematic cross section of a disposable isolator including a weight scale.

This hemisphere is a type of bag enveloping any material placed inside this bag. Top portion 10, bottom portion 20, and side walls 30 may be made of a same or different disposable material such as PE, PP, PFA, PEEK, etc. It may be multilayer materials. When non-inflated, this envelope is placed on a working table 110. To correctly place the disposable isolator 1, care should be taken to place the support area 21 on the support means 22 which is here a XY or XYZ plate (see FIG. 2). Said support means 22 is located outside the disposable isolator 1. Then the envelope or bag may be inflated. Inflation of said bag is performed by using an inert gas such as nitrogen, argon, etc, via either the outlet 102 or inlet 100, or other inlet/outlet non represented here. The bag comprises structure forming means 50, such as tubes, which may be inflated to define the hemisphere shape of the bag and keep it sufficiently rigid to avoid a complete deflation of the bag when inside portion 40 of said bag is deflated. Said tubes may be a type of double envelope formed in the same or a different material as top portion 10, bottom portion 20, and side walls 30. An embodiment of this structure forming means is illustrated on FIG. 1C. Any material may be introduced after inflation of said bag via inlet means 100 and discharged via outlet means 110. Gloves or other manipulating means may be placed at a suitable position on the bag side walls 30 for manipulating any material to be placed inside or discharged from said bag or disposable isolator. A filling means 12, such as here a needle, is locked in the top portion 10 of the bag forming hemisphere. A filling tube 14 may be connected to the needle 12 to fill a container 80 by a suitable product via the needle 12. Said filling tube 14 may be connected to a pump or another device controlling the quantity of product added. A tray 90 of vials or containers 80 is placed in the inside portion 40 of the bag support area 21, so that said tray 90 is located inside said bag, isolated from the outside bag atmosphere, kept and manipulated under a controlled atmosphere (see FIG. 3). The position of the containers or vials 80 is adjusted via said XY or XYZ plate 22. The tray 90 moves jointly with said XY plate 22 because of locking means 60 and 70, such as protuberances or lugs, placed to lock said tray 90 and XY plate 22. Locking means 60 and 70 may be independent and may be each independently continuous or discontinuous along or around the plane surface 25. Filling is performed after downward movement of said needle 12 and correct position of a vial in front of said needle (see FIGS. 4 and 5). Said bag and structure forming means should be sufficiently flexible to allow said downward movement of said needle. Such movement of the needle is guided for example via an arm 200. Alternatively said needle may be fixed and vials are correctly positioned via upward movement of a XYZ plate or other support means allowing placing a container in a position to be filled via said filling means. When a vial is filled another vial or container 80 is positioned in front of said needle 12 via said XY or XYZ plate for its filling, etc. The support area of said bag comprises a sufficient rigid plane surface 25 to be placed without wrinkle on the support means 22 (such as said XY plate). A tray 90 is positioned on the inner surface of said plane surface 25. Said surface area 21 comprises wrinkled or zigzag side walls 26 allowing downward and upward movements of said plane surface 25. After filling of all vials or containers 80, the tray 90 may be discharged via outlet means 102. Prior to positioning said tray 90 on the plane surface 25 it may be placed on a weight scale 96 to tare one or more containers or vials before filling (see FIG. 6). After filling, the same operation may be performed to check the quantity of product added into the vials or containers. Said weight scale 96 is positioned in the same manner as the support means (XY plate), i.e. the non-inflated bag 1 is positioned on the weight scale 96 so that a defined area of the bottom portion 20 of said bag is positioned correctly on the weight scale 96. The weight scale 96 is located outside said disposable isolator or bag 1. For helping correctly positioning said bag/disposable isolator 1 and especially said support area 21 on the support means (such as XY plate) 22, one or more cross or visual help may be located either on the bag 1 or the working table 120. For example a special table is designed to help the technician positioning the disposable isolator and other means of the invention. A cross or a visual help may be placed on the working table 120 at the location of the support means 22 (as a XY or XYZ plate) to position said support means at the correct location on the working table 120. Then the non-inflated bag 1 is positioned on the working table 120, said bag support area 21 being positioned on the support means 22 as explained above. A visual help may be used to position other means such as the weight scale 96.

Figure 7:
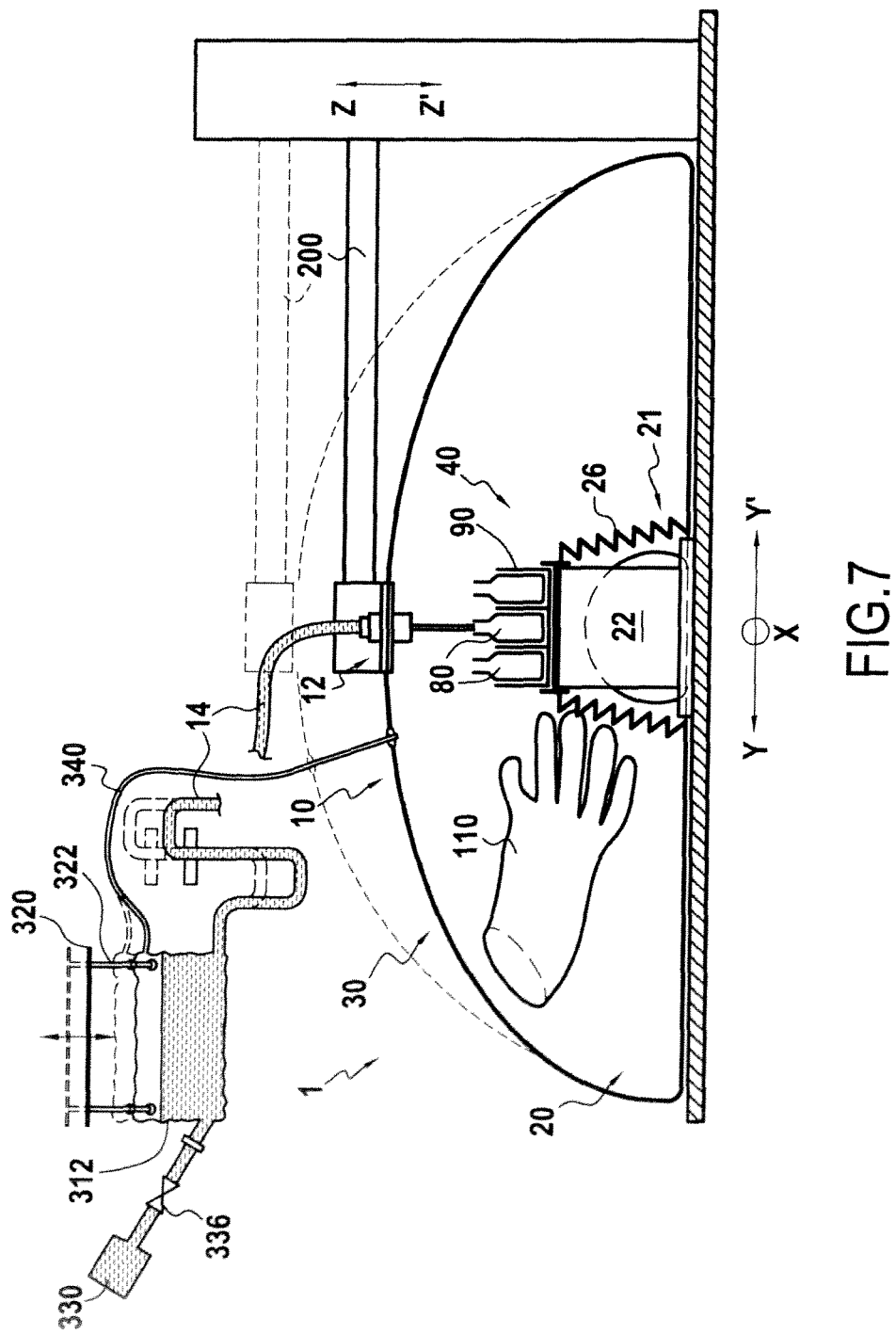
FIG. 7 represents a schematic view of a disposable isolator having a connexion to the fluid dispenser recipient to avoid negative influence of the pressure variations which may occur during the filling.

FIG. 7 represents a schematic view of a fluid dispensing apparatus according to FIG. 1A of WO2007/019568 used as a dispenser of a fluid and thus as a filling means according to the present invention. The fluid dispensing apparatus includes a fluid reservoir 312, a dispense tube 14, and an elevator mechanism 320. The fluid reservoir 312 receives a fluid from a fluid supply 330 that will be dispensed into one or more containers 80. The dispense tube 14 has a dispense outlet, and is connected to an outlet port on the fluid reservoir 312. The dispense tube 14 includes a U-shape part. The elevator mechanism 320 changes a relative vertical displacement between the higher point of the U-shape part of said tube 14 and the fluid level in the fluid reservoir 312, such that the fluid is dispensed when the higher point of the U-shape part of said tube 14 is lower than the fluid level in the fluid reservoir 312, and not dispensed when the higher point of the U-shape part of said tube 14 is higher than the fluid level in the fluid reservoir 312. In one embodiment, for example, the elevator mechanism 320 changes the relative vertical displacement by raising and lowering the dispense tube, and for example the U-shape part. In another embodiment, the elevator mechanism 320 changes the relative vertical displacement by raising and lowering the fluid reservoir. To control the elevator mechanism 320, a processor may generate control signals responsive to one or more sensors. The sensors detect a variety of conditions associated with the fluid, such as fluid levels, fluid volume, and net weight of a container being filled, for example. Based on these detected fluid conditions, the processor may control an actuator to raise or lower the elevator mechanism. Support brackets 322 may help fixing said fluid reservoir 312 to the elevator mechanism 320. Advantageously a tube 340 is connecting said fluid reservoir 312 and said disposable isolator 1 so that the gas pressure in the upper part of the fluid reservoir 312 is substantially the same, or theoretically the same, as the pressure of the isolator inside portion 40. This tube 340 may be located in the top portion 10, on the side walls 30, or in the bottom portion 20. A particular embodiment of said dispenser tube 14 includes a measuring portion that measures and holds a predetermined volume of fluid to be dispensed. One embodiment is shown in FIG. 4B of WO 2007/0019568. One or more breather bag may compensate for varying pressures in measuring portion. These one or more breather bags may be connected to the isolator 1 pressure via the tube 340.

Other aims, characteristics and advantages of the invention will appear clearly to the person skilled in the art upon reading the explanatory description which makes reference to the figures which are given simply as an illustration and which in no way limit the scope of the invention.

The figures make up an integral part of the present invention, and any characteristic which appears novel with respect to any prior state of the art from the description taken in its entirety, including the figures, makes up an integral part of the invention in its function and in its generality.

Thus, every figure has a general scope.

The invention claimed is:

1. A kit for filling at least one container supported by a support structure, said kit comprising:
   a vessel for housing the at least one container in an interior of the vessel, said vessel comprising a receiver for receiving the support structure on an exterior of the vessel; and
   means for filling the at least one container when the container is present in the interior of the vessel;
   wherein said receiver is moveable relative to the vessel for moving the at least one container in the interior of the vessel.

2. The disposable isolator of claim 1, wherein the vessel is a flexible bag adapted for inflation and deflation.

3. The disposable isolator of claim 2, further including a connector for connecting the filling means to the flexible bag, such that the filling means is moveable upon inflation and deflation of the bag.

4. The disposable isolator of claim 1, wherein the receiver comprises a support surface on the interior of the vessel for supporting the at least one container, and at least one flexible sidewall.

5. The disposable isolator of claim 1, further including a second receiver for receiving a measuring instrument positioned on the exterior of the vessel.

6. The disposable isolator of claim 1, further including at least one aperture for accessing the interior of the vessel.

7. The disposable isolator of claim 6, further including a pair of gloves for manipulating the at least one container within the vessel.

* * * * *